US007422189B2

(12) United States Patent
Militz et al.

(10) Patent No.: US 7,422,189 B2
(45) Date of Patent: Sep. 9, 2008

(54) DEVICE FOR FIXING A VEHICLE ANTENNA

(75) Inventors: Uwe Militz, Berlin (DE); Christian Schmidt, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 1131 days.

(21) Appl. No.: 10/220,682

(22) PCT Filed: Mar. 2, 2001

(86) PCT No.: PCT/DE01/00779

§ 371 (c)(1),
(2), (4) Date: Nov. 18, 2002

(87) PCT Pub. No.: WO01/65634

PCT Pub. Date: Sep. 7, 2001

(65) Prior Publication Data

US 2003/0089834 A1 May 15, 2003

(30) Foreign Application Priority Data

Mar. 3, 2000 (DE) ................................ 100 09 978

(51) Int. Cl.

| | |
|---|---|
| ***A01K 97/10*** | (2006.01) |
| ***A45B 25/28*** | (2006.01) |
| ***A47G 25/12*** | (2006.01) |
| ***A47G 33/12*** | (2006.01) |
| ***H01G 1/12*** | (2006.01) |

(52) U.S. Cl. .................... 248/539; 248/224.8; 248/534; 343/711

(58) Field of Classification Search ............. 248/224.8, 248/71, 534, 73; 343/711, 712, 713, 715; 249/539
See application file for complete search history.

(56) References Cited

U.S. PATENT DOCUMENTS

| | | | | |
|---|---|---|---|---|
| 2,953,630 | A * | 9/1960 | Cejka | 174/153 A |
| 2,965,340 | A * | 12/1960 | Chadowski | 248/539 |
| 3,443,783 | A | 5/1969 | Fisher | |
| 3,545,148 | A * | 12/1970 | Mandino | 52/110 |
| 3,664,617 | A * | 5/1972 | Fenwick | 248/539 |
| 4,200,874 | A * | 4/1980 | Harada | 343/715 |
| 4,360,814 | A * | 11/1982 | Wells | 343/750 |
| 4,692,770 | A * | 9/1987 | Kadokura | 343/715 |
| 4,788,550 | A * | 11/1988 | Chadima, Jr. | 343/712 |
| 5,456,442 | A * | 10/1995 | Sutton et al. | 248/534 |
| 5,838,281 | A * | 11/1998 | Blaese | 343/715 |
| 5,896,110 | A * | 4/1999 | Kojima | 343/715 |
| 6,157,350 | A * | 12/2000 | House et al. | 343/906 |
| 6,486,841 | B1 * | 11/2002 | Imahigashi | 343/715 |
| 6,509,878 | B1 * | 1/2003 | Tornatta et al. | 343/715 |
| 6,554,232 | B1 * | 4/2003 | Macris | 248/71 |

FOREIGN PATENT DOCUMENTS

| | | |
|---|---|---|
| DE | 296 16 944 | 11/1996 |
| FR | 2 691 841 | 12/1993 |
| JP | 10022718 | 1/1998 |

* cited by examiner

*Primary Examiner*—Amy J. Sterling
(74) *Attorney, Agent, or Firm*—Kenyon & Kenyon LLP

(57) ABSTRACT

A device for securing a vehicle antenna to a vehicle body is described, to prevent the vehicle antenna from tilting out of the vehicle body in the mounting operation. The device includes projections which engage behind an orifice in the vehicle body for introducing the device on the side of the vehicle body facing away from the vehicle antenna.

10 Claims, 3 Drawing Sheets

DEVICE FOR FIXING A VEHICLE ANTENNA

FIELD OF THE INVENTION

The present invention relates to a device for securing a vehicle antenna.

BACKGROUND INFORMATION

Devices for securing a vehicle antenna to a vehicle body are already known in the form of threaded bolts which are passed through an orifice in the vehicle body and have, on the side of the vehicle body facing the vehicle antenna, a mounting plate having a cross-sectional area which extends beyond the cross-sectional area of the orifice and, on the side of the vehicle body facing away from the vehicle antenna, a thread for securing the threaded bolt to the vehicle body using a fastening nut.

If the threaded bolt for mounting the vehicle antenna on the vehicle body is passed through the orifice in the vehicle body, the threaded bolt or the vehicle antenna attached to it must be secured outside the vehicle body, while at the same time inside the vehicle body the antenna cable leading away from the vehicle antenna over the threaded bolt must be bent and the fastening nut must be installed. If the threaded bolt and/or the vehicle antenna are not secured outside the vehicle body, the vehicle antenna attached to the threaded bolt may tilt over during the mounting operation and/or slip out of the orifice in the vehicle body and cause the mounting operation to be unsuccessful. Therefore, under some circumstances two people are necessary for the mounting operation described here, depending on the type of vehicle, one person to hold the threaded bolt together with the vehicle antenna while the other person screws it onto the vehicle body.

SUMMARY OF THE INVENTION

The device according to the present invention has the advantage over the related art that the device includes projections engaging behind an orifice in the vehicle body for introducing the device on the side of the vehicle body facing away from the vehicle antenna. This achieves a temporary securing of the device to the vehicle body, making it possible for a vehicle antenna attached to the device to be secured in the orifice when introduced into it, and therefore it is no longer able to tilt away. Thus, only one person is necessary for the operation of mounting the vehicle antenna on the vehicle body, and the mounting operation itself does not require any particular dexterity.

An especially simple and mechanically less complicated implementation of the temporary mount described here is obtained when the projections are located so that the device may be introduced into the orifice by having the projections in a predetermined position with respect to the orifice, and the projections engage behind the orifice when the device is rotated after introduction into the orifice. In this implementation, the projections may be attached in one piece to the device and thus may be manufactured in a single manufacturing operation together with the device itself, e.g., by a casting or injection molding technique.

Due to the use of a polygonal cross-sectional area for the device corresponding to a matching polygonal cross-sectional area of the orifice, it is possible to prevent the device and/or the vehicle antenna attached to it from twisting in the orifice during assembly and when tightening the fastening nut. Therefore, the mounting procedure is not made more difficult and prolonged or even prevented entirely due to the device also turning because of the fastening nut being screwed onto it.

It is also advantageous in particular if the projections are designed as spring elements having two legs, their legs being brought together in the direction of introduction of the device into the orifice and projecting beyond the first cross-sectional area of the device, so that when the device is introduced into the orifice, the legs are pressed together by a bordering wall of the orifice in passing through the orifice and they spring back on the opposite side of the orifice facing away from the vehicle antenna and then engage behind the orifice. This implements a form of snap connection which produces an improved temporary mounting of the device on the vehicle body because this temporary mounting cannot be detached again even by a rotational motion.

It is advantageous that the spring elements are situated on a clamp which encloses the device in the area of its first cross-sectional area. In this way, it is possible to produce all the spring elements together with the clamp in a single operation, e.g., by an injection molding or casting operation.

Another advantage is that on the side of the vehicle body facing the vehicle antenna, the device includes a mounting plate having a cross-sectional area which extends beyond the cross-sectional area of the orifice, and an elastic material is introduced between the mounting plate and the vehicle body. In this way, the form-fitting connection, formed by the projections, of the device to the vehicle body may be supported by the elastic material in a friction-locked manner.

DETAILED DESCRIPTION

Figure 1:
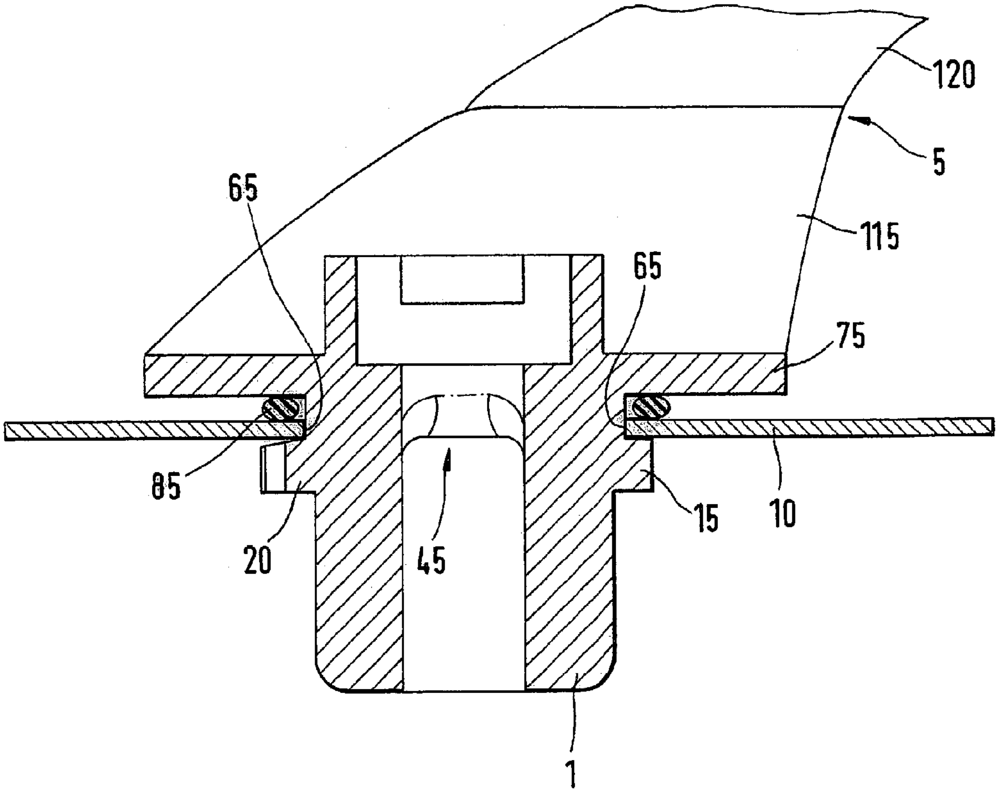
FIG. 1 shows a longitudinal section through a device according to the present invention for securing a vehicle antenna to a vehicle body according to a first embodiment.

FIG. 1 shows a device 1 for securing a vehicle antenna 5 to a vehicle body 10. Device 1 is designed as a threaded bolt as an example. Threaded bolt 1 may be introduced into an orifice 45 in the vehicle body. Threaded bolt 1 includes a mounting plate 75 to which an antenna base 115 together with an antenna rod 120 of a vehicle antenna 5 is secured. Vehicle antenna 5 and mounting plate 75 are situated outside of vehicle body 10. Since a cross-sectional area 80 of mounting plate 75 is larger than a cross-sectional area 55 of orifice 45, threaded bolt 1 may be pushed or otherwise introduced into the interior of the vehicle formed by the vehicle body until mounting plate 75 rests on vehicle body 10. Threaded bolt 1 has a first projection 15 and a second projection 20 which engage behind orifice 45 inside vehicle body 10 and thus on the side of vehicle body 10 facing away from vehicle antenna 5, so that threaded bolt 1 cannot fall out of vehicle body 10. Thus, a form-fitting connection of threaded bolt 1 to vehicle body 10 is achieved by first projection 15 and second projection 20. This form-fitting connection may be supported by a friction-locked connection by introducing an elastic material 85, e.g., an elastomer material, between mounting plate 75 and vehicle body 10. In the area of projections 15, 20, threaded bolt 1 has an outside thread which corresponds to an inside thread in a fastening nut (not shown in the figures), so that the fastening nut may be screwed onto threaded bolt 1 in the area of projections 15, 20, for final mounting of vehicle antenna 5 on vehicle body 10, and the fastening nut mounted in this way may be tightened completely by controlled tightening using a torque wrench.

Figure 2:
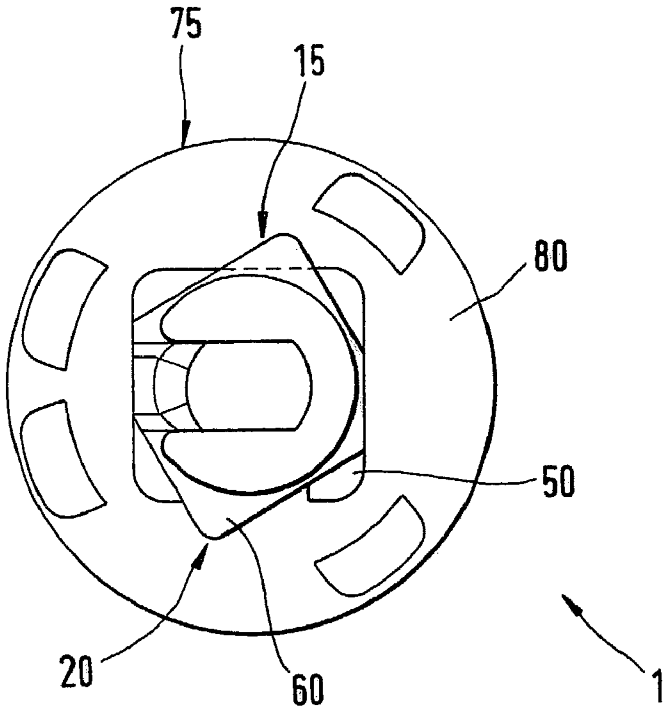
FIG. 2 shows a view of the bottom side of the device according to the present invention in a first embodiment.

FIG. 2 shows a view of the bottom side of threaded bolt 1 from the opposite direction from vehicle antenna 5. In this exemplary embodiment, cross-sectional area 80 of mounting plate 75 is approximately circular and is larger than cross-sectional area 55 of orifice 45 according to FIG. 6, so that mounting plate 75 may rest on vehicle body 10, i.e., on elastic material 85, outside of vehicle body 10. In this example, threaded bolt 1 also includes a first cross-sectional area 50, which is approximately square, the corners optionally being rounded. Threaded bolt 1 includes first cross-sectional area 50 in the area of orifice 45. Beneath this area, i.e., already inside of vehicle body 10 and in the area of projections 15, 20, threaded bolt 1 in this example includes an approximately hexagonal second cross-sectional area 60. Second cross-sectional area 60 according to the example illustrated in FIG. 2 is a square which is cropped on two diametrically opposed corners, and has an uncropped cross-sectional area corresponding approximately to first cross-sectional area 50 and being concentric with first cross-sectional area 50 and rotated with respect to it so that the uncropped corners of second cross-sectional area 60 form projections 15, 20 which engage behind orifice 45. If the uncropped corners of second cross-sectional area 60 are rounded, projections 15, 20 are reduced in size for engaging behind orifice 45. The larger the radius of curvature, the smaller are projections 15, 20, i.e., the smaller is the area in which projections 15, 20 engage behind orifice 45.

Figure 6:
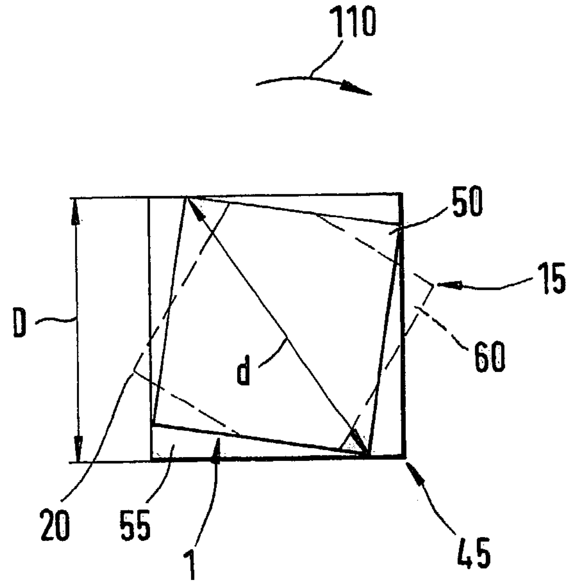
FIG. 6 shows a top view of the device according to the first embodiment of the present invention, introduced into the orifice in the vehicle body.

FIG. 6 shows how threaded bolt 1 is secured on vehicle body 10 by a form-fitting connection. This presupposes that cross-sectional area 55 of orifice 45 is also approximately square. First cross-sectional area 50 is smaller than cross-sectional area 55 of orifice 45. However, diagonal d of first cross-sectional area 50 is larger than side length D of cross-sectional area 55 of first orifice 45. Since second cross-sectional area 60 is derived from first cross-sectional area 50, as described above, this ensures that it is possible to introduce both first cross-sectional area 50 and second cross-sectional area 60 through orifice 45 into the interior of vehicle body 10 with appropriate positioning, introducing them until mounting plate 75 is stopped by elastic material 85 or vehicle body 10. However, first cross-sectional area 50 and second cross-sectional 60 may be introduced through orifice 45 into the interior of vehicle body 10 only if their mutual rotation does not exceed a predetermined angle value, this predetermined angle value depending on d/D ratio. For example, a value of 15 mm may be selected for D and a value of 14.8 mm may be selected for the side length of first cross-sectional area 50. For the rotation of first cross-sectional area 50 relative to second cross-sectional area 60, angles of rotation of 20° to 30° are appropriate. If, with threaded bolt 1 introduced into orifice 45, the fastening nut is screwed onto threaded bolt 1 in the area of projections 15, 20 in the direction of rotation illustrated on the basis of reference notation 110 in FIG. 6, the threaded bolt usually also rotates with the fastening nut due to the rotation of the fastening nut in the direction of rotation 110. Threaded bolt 1 is located completely inside vehicle body 10 in the area of projections 15, 20, whereas the area of threaded bolt 1 having first cross-sectional area 50 is in the area of orifice 45. Thus, threaded bolt 1 becomes tilted relative to orifice 45 in direction of rotation 110, in the area of first cross-sectional area 50, whereas threaded bolt 1 is not blocked in its rotational motion by orifice 45 in the area of second cross-sectional area 60, i.e., in the area of projections 15, 20. Due to the tilting of threaded bolt 1 relative to orifice 45 in the area of first cross-sectional area 50, a twist-proof mounting is thus achieved, preventing threaded bolt 1 from turning with the fastening nut in the rotational motion of the fastening nut, which could thus delay or even prevent the mounting operation. Furthermore, vehicle antenna 5 is in its final installed position with threaded bolt 1 tilted. Due to the fact that threaded bolt 1 is not tilted relative to orifice 45 in the area of second cross-sectional area 60, the result is that in rotational motion 110, the uncropped corners of second cross-sectional area 60 engage behind orifice 45 in the manner illustrated in FIG. 1, so that threaded bolt 1 is prevented from falling out of vehicle body 10.

The resulting form-fitting connection of threaded bolt 1 to vehicle body 10 is supported in a friction-locked manner by elastic material 85 in the manner described here. In the embodiment described here, threaded bolt 1 is designed as a square whose first cross-sectional area 50 is approximately square and whose second cross-sectional area 40 is approximately hexagonal. In the case of second cross-sectional area 60, it is not necessary to crop the two corners described here for the function of the threaded bolt according to the present invention. In general, threaded bolt 1 according to the present invention may also be implemented with a first cross-sectional area 50 in the form of a polygonal area and a second cross-sectional area 60 derived therefrom by cropping two corners, for example, in the manner described above. Finally, first cross-sectional area 50 may assume any desired shape except that of a circle if second cross-sectional area 60 is rotated with respect to first cross-sectional area 50 in the angle range described above and if it is derived from first cross-sectional area 50 in such a way that two or more projections are formed when it is rotated in the direction of rotation 110, these projections forming a form-fitting connection between threaded bolt 1 and vehicle body 10 in the manner described above.

A torque of 7 Nm, for example, is used for final securing by the fastening nut. Then it is no longer possible to unscrew the antenna manually. At a lower tightening torque, it may be necessary to provide a safety device to prevent unscrewing. This is then ensured by the form-fitting connection. Then form-fitting elements, for example, are provided on the fastening nut, engaging in the free area between orifice 45 and threaded bolt 1 in the area of first cross-sectional area 50 when screwed in.

Figure 3:
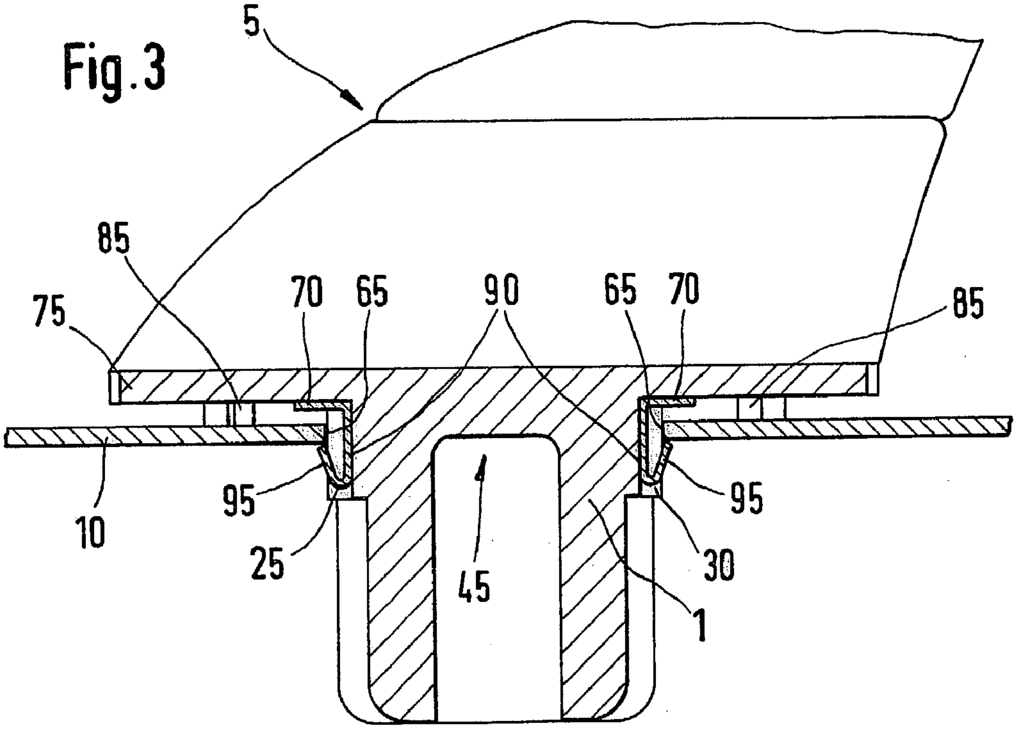
FIG. 3 shows a longitudinal section through a device according to the present invention in a second embodiment.
Figure 4:
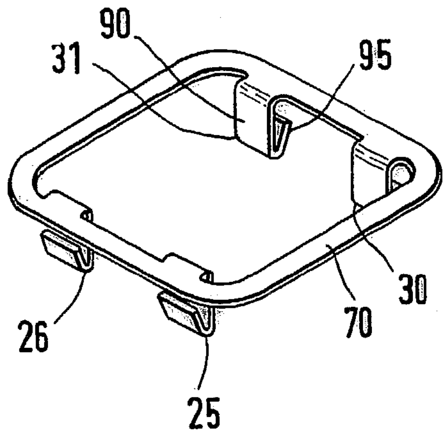
FIG. 4 shows a clamp having curved spring elements.
Figure 5:
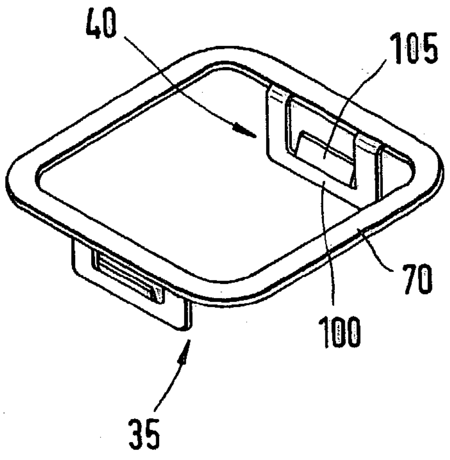
FIG. 5 shows a clamp having cut-in spring elements.

A second embodiment of threaded bolt 1 according to the present invention is illustrated in FIGS. 3, 4 and 5. In these figures, the same reference numbers denote the same elements as in FIGS. 1, 2 and 6. In contrast with the first exemplary embodiment according to FIGS. 1, 2 and 6, no two cross-sectional areas shifted relative to one another are provided for threaded bolt 1 in the area of orifice 45 and below it in the interior of vehicle body 10 in the second exemplary embodiment according to FIG. 3. Instead, according to FIG. 3, a third projection 25 and a fourth projection 30 are provided, each being designed as a spring element having two legs, their legs 90, 95 being brought together in the direction of the introduction of threaded bolt 1 into orifice 45, extending beyond first cross-sectional area 50 of threaded bolt 1 in the area of orifice 45 so that they are compressed by a bordering wall 65 of orifice 45 on introduction into orifice 45 and pass through orifice 45 in this form, springing back on the side of orifice 45 facing away from vehicle antenna 5 to engage behind orifice 45 there.

It is necessary to ensure that sufficient space is available between threaded bolt 1 and bordering wall 65 in the area of orifice 45 for the spring path when these spring elements 25, are compressed, so that the introduction of threaded bolt 1 into orifice 45 is not blocked.

The contact of mounting plate 75 on vehicle body 10 may be implemented by elastic material 45 as already explained above for the first exemplary embodiment.

According to FIGS. 4 and 5, it is now possible to provide for spring elements 25, 30 to be joined together by a clamp 70. Both spring elements 25, 30 and clamp 70 are advantageously made of metal. Clamp 70 may be designed as a washer, for example, which is shaped so that it surrounds threaded bolt 1 in the area of its first cross-sectional area 50, its orifice being adapted accordingly to the shape of first cross-sectional area 50. As illustrated in FIG. 3, clamp 70 may rest on mounting plate 75 directly beneath mounting plate 75 and may have an outside diameter which is larger than the diameter of orifice 45 to prevent spring elements 25, from slipping down into the interior of vehicle body 10 after introduction of threaded bolt 1 into orifice 45. Spring elements 25, 30 are then bent downward approximately at a right angle from clamp 70 in the direction of the interior of vehicle body 10, so that after being compressed as described above, they may be introduced through orifice 45 to the extent that they engage behind orifice 45 in the interior of vehicle body 10 with their free legs, labeled with reference number 95 in FIG. 3, and in this way produce a form-fitting connection of threaded bolt 1 in vehicle body 10 which is further supported in a friction-locked manner by elastic material 85. Due to elastic material 85 in both the first and second exemplary embodiments, it is ensured that mounting plate 75 as well as projections 15, 20, 25, 30 press against the vehicle body on their particular sides with respect to vehicle body 10 when threaded bolt 1 is introduced into orifice 45. For such a form-fitting and friction-locked engagement, at least two projections 15, 20, 25, 30 are present in both exemplary embodiments to prevent threaded bolt 1 from tilting out of orifice 45.

FIG. 4 illustrates a first example of a clamp 70 having spring elements. Four spring elements 25, 26, 30, 31 are provided on clamp 70, each being designed with two legs, a first leg 90 being bent down approximately at a right angle away from clamp 70 and a second free leg 95 being bent away from first leg 90. For the sake of simplicity, only the legs of one of spring elements 25, 26, 30, 31 is labeled with reference numbers 90, 95 in FIG. 4.

Second leg 95 is curved outward away from first leg 90 on the side of spring element 25, 26, 30, 31 facing away from clamp 70 so that it is able to engage behind orifice 45 in the manner described above.

In a second example according to FIG. 5, two spring elements are provided on clamp 70, namely a fifth spring element 35 and a sixth spring element 40. These two spring elements 35, 40 are also designed to have two legs, a third leg 100 being bent downward perpendicularly away from clamp 70. Each of two spring elements 35, 40 according to the second example in FIG. 5 also includes a fourth leg 105, which is cut out of third leg 100 and is bent outward away from the side of spring element 35, 40 facing away from clamp 70 to be able to engage behind orifice 45.

In this way, fourth leg 105 is cut in with respect to third leg 100.

In all the embodiments described here, elastic material 85 is also used to seal orifice 45 to prevent the admission of water in order to prevent corrosion.

What is claimed is:

1. A device for securing a vehicle antenna to a vehicle body, comprising:

a plurality of projections that engage behind an orifice in the vehicle body for introducing the device on a side of the vehicle body facing away from the vehicle antenna, wherein:

the projections are situated in such a way that the device, together with the projections, is introducible into the orifice in a predetermined position with respect to the orifice, and the projections engage behind the orifice by rotation of the projections with respect to the side of the vehicle facing away from the vehicle antenna after introduction into the orifice; and a body including a first cross-sectional area in the form of a polygonal figure outside an area of the projections, the polygonal figure corresponding to a cross-sectional area of the orifice such that the device is introducible into the orifice outside the area of the projections, wherein:

the body includes a second cross-sectional area in the area of the projections that also corresponds to the cross-sectional area of the orifice such that the device is also introducible into the orifice in the area of the projections, the first cross-sectional area and the second cross-sectional are not identical to each other, the body is in the form of a square, the first cross-sectional area is approximately square, and the second cross-sectional area is approximately hexagonal.

2. A device for securing a vehicle antenna to a vehicle body, comprising:

a plurality of projections that engage behind an orifice in the vehicle body for introducing the device on a side of the vehicle body facing away from the vehicle antenna, wherein:

the projections are situated in such a way that the device, together with the projections, is introducible into the orifice in a predetermined position with respect to the orifice, and the projections engage behind the orifice by rotation of the projections with respect to the side of the vehicle facing away from the vehicle antenna after introduction into the orifice, and the projections include two-legged spring elements having legs that are brought together in a direction of introduction of the device into the orifice and that project beyond a first cross-sectional area of the device such that the legs are pressed together by a bordering wall of the orifice on introduction into the orifice and thus pass through the orifice and spring back on a side of the orifice facing away from the vehicle antenna to engage behind the orifice.

3. The device as recited in claim 2, wherein:

the two-legged spring elements are situated on a clamp surrounding the device in an area of the first cross-sectional area.

4. The device as recited in claim 3, wherein:

at least one of the two-legged spring elements includes a first leg connected to the clamp and a second leg that is bent away from the first leg.

5. The device as recited in claim 3, wherein:

at least one of the two-legged spring elements includes a first leg connected to the clamp and a second leg that is cut in from the first leg.

6. A device for securing a vehicle antenna to a vehicle body, comprising:

a plurality of projections that engage behind an orifice in the vehicle body for introducing the device on a side of the vehicle body facing away from the vehicle antenna, wherein:

the projections are situated in such a way that the device, together with the projections, is introducible into the orifice in a predetermined position with respect to the orifice, and the projections engage behind the orifice by rotation of the projections with respect to the side of the vehicle facing away from the vehicle antenna after introduction into the orifice;

a mounting plate having a cross-sectional area that extends beyond a cross-sectional area of the orifice on a side of the vehicle body facing the vehicle antenna; and an elastic material introduced between the mounting plate and the vehicle body.

7. The device as recited in claim 6, wherein:

the elastic material includes an elastomer material.

8. The device as recited in claim 1, wherein:

the first cross-sectional area is non-circular.

9. The device as recited in claim 1, wherein:

the first cross-sectional area is non-perfectly round.

10. The device as recited in claim 1, wherein:

the first cross-sectional area is polygonal, and the second cross-sectional area is polygonal with two cropped corners.

* * * * *